US011075689B1

(12) United States Patent
Hassan et al.

(10) Patent No.: US 11,075,689 B1
(45) Date of Patent: Jul. 27, 2021

(54) SATELLITE DATA TRANSMISSION CLUSTERING WITH DYNAMIC CLUSTERS

(71) Applicant: Microsoft Technology Licensing, LLC, Redmond, WA (US)

(72) Inventors: Amer Aref Hassan, Kirkland, WA (US); Mahendra D. Sekaran, Sammamish, WA (US); Ronald F. Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/773,666

(22) Filed: Jan. 27, 2020

(51) Int. Cl.
*H04J 3/16* (2006.01)
*H04B 7/185* (2006.01)
*H04W 84/06* (2009.01)

(52) U.S. Cl.
CPC ......... *H04B 7/18513* (2013.01); *H04W 84/06* (2013.01)

(58) Field of Classification Search
CPC ..... H04W 84/06; H04W 16/28; H04W 40/12; H04N 21/6112; H04N 21/6143; H01Q 1/288; H04L 47/14
See application file for complete search history.

(56) References Cited

U.S. PATENT DOCUMENTS

| | | |
|---|---|---|
| 5,303,286 A | 4/1994 | Wiedeman |
| 5,625,867 A | 4/1997 | Rouffet et al. |
| 5,641,134 A | 6/1997 | Vatt |
| 5,708,965 A | 1/1998 | Courtney |
| 6,011,951 A | 1/2000 | King et al. |
| 6,157,621 A | 12/2000 | Brown et al. |
| 6,633,745 B1 | 10/2003 | Bethscheider |
| 6,954,613 B1 | 10/2005 | Castiel et al. |
| 7,340,764 B2 | 3/2008 | Kubota et al. |
| 7,353,279 B2 | 4/2008 | Durvasula et al. |
| 7,502,382 B1 | 3/2009 | Liu et al. |
| 8,511,617 B2 | 8/2013 | Caplin et al. |
| 8,600,292 B2 | 12/2013 | Jalali |
| 10,069,935 B1 | 9/2018 | Coleman et al. |
| 10,097,903 B2 | 10/2018 | Beals |
| 10,264,509 B2 | 4/2019 | Torres et al. |
| 2003/0069043 A1 | 4/2003 | Chhaochharia et al. |
| 2015/0066646 A1 | 3/2015 | Sriharsha et al. |
| 2016/0012367 A1 | 1/2016 | Korb et al. |
| 2016/0094288 A1 | 3/2016 | Krebs |

(Continued)

OTHER PUBLICATIONS

Bai, et al., "Multi-Satellite Relay Transmission in 5G: Concepts, Techniques, and Challenges", In Proceeding of IEEE Network, vol. 32, Issue 5, Sep. 27, 2018, pp. 38-44.

(Continued)

*Primary Examiner* — Khalid W Shaheed
(74) *Attorney, Agent, or Firm* — Schwegman Lundberg & Woessner, P.A.

(57) ABSTRACT

Disclosed in some examples are methods, systems, and machine-readable mediums A method for satellite communications. A computing device concurrently communicates with two or more satellites of a cluster of satellites in a satellite network. The clusters are dynamically adjusted to achieve a communication objective. This improves satellite communications by increasing that likelihood that the computing device will be in range of a satellite that is useful for achieving the communication objective.

20 Claims, 8 Drawing Sheets

(56) References Cited

U.S. PATENT DOCUMENTS

| | | |
|---|---|---|
| 2016/0269098 A1 | 9/2016 | Janson |
| 2017/0070939 A1 | 3/2017 | Chong et al. |
| 2017/0105153 A1* | 4/2017 | Ashrafi ............... H04B 17/336 |
| 2018/0323863 A1 | 11/2018 | Bournes |
| 2019/0104132 A1* | 4/2019 | Cooper ............... H04W 72/082 |
| 2020/0059296 A1* | 2/2020 | Regunathan ....... H04B 7/18519 |
| 2020/0162985 A1* | 5/2020 | Roy ...................... H04W 36/08 |
| 2020/0313760 A1* | 10/2020 | Laws ................. H04B 7/18515 |

OTHER PUBLICATIONS

Yi, et al., "Satellite Constellation of MEO and IGSO Network Routing with Dynamic Grouping", In International Journal of Satellite Communications and Networking, vol. 31, No. 6, Jun. 27, 2013, pp. 277-302.

\* cited by examiner

US 11,075,689 B1

SATELLITE DATA TRANSMISSION CLUSTERING WITH DYNAMIC CLUSTERS

BACKGROUND

Satellite communication systems include one or more artificial satellites (hereinafter, "satellite" or "satellites") that are configured to provide communication services to terrestrial computing devices (hereinafter, "computing devices"). Such communication services can include the establishment and maintenance of packet switched data communication channels between the satellites and the computing devices. In an example, a packet switched data communication channel (hereinafter, "communication channel") can be established between a satellite and a computing device through direct line of sight (LOS) radio communication between the satellite and the computing device. In another example, a communication channel can be established between a satellite and a computing device though direct LOS radio communication between the satellite and a ground station and relayed communication between the ground station and the computing device. Generally, communication channels can be established, or maintained, when a satellite and at least one of a ground station or a computing device are within LOS radio communication range of each other. Such communication channels are configured to support communication sessions between applications executing on two or more remote computing devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
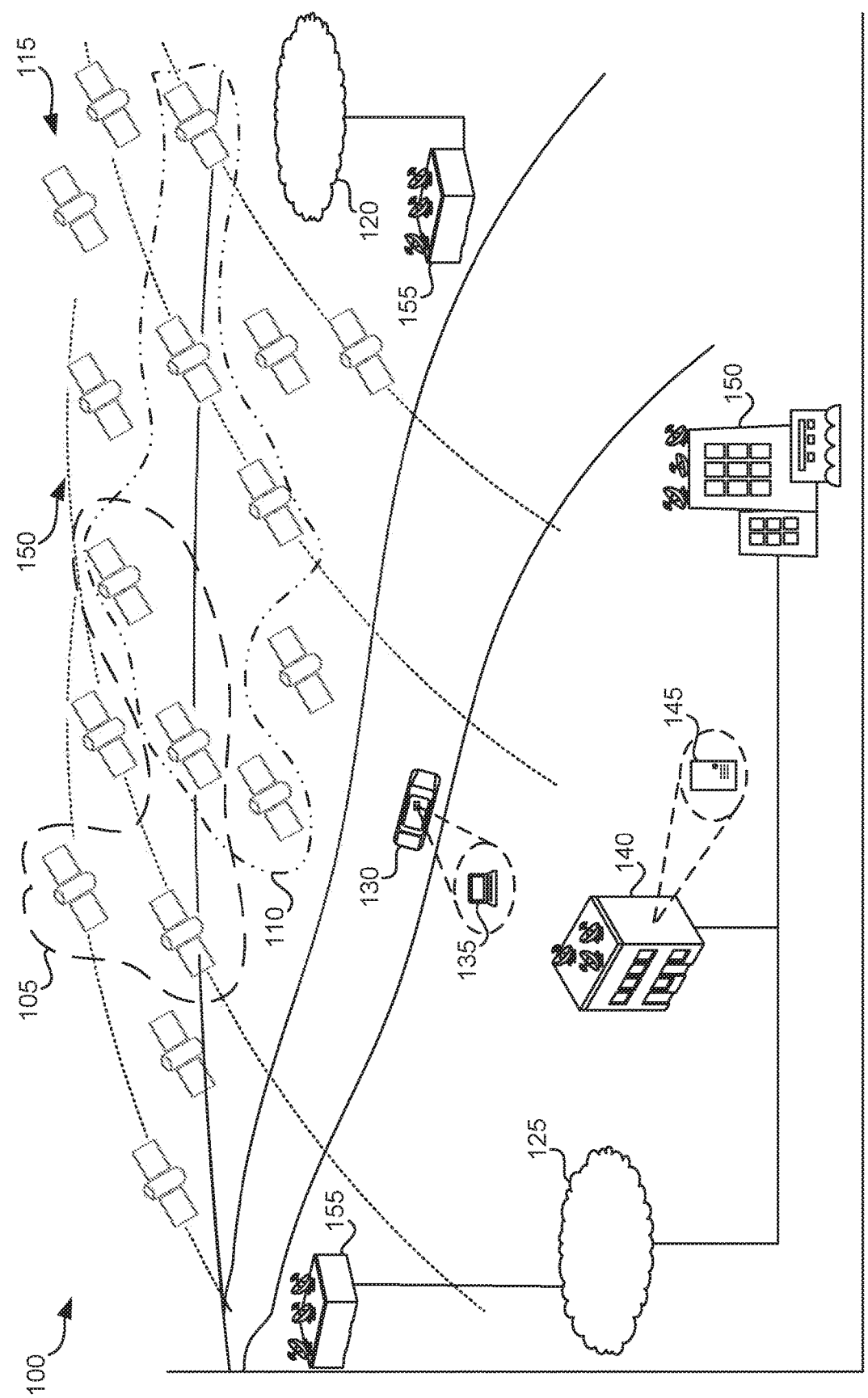
FIG. 1 illustrates components of a system for satellite data transmission clustering with dynamic clusters, according to some examples of the present disclosure.

Aspects of the present disclosure are based on the realization that a communication channel established between a satellite network and a computing device can be too ephemeral or transient to meet communication quality requirements of a communication session that is supported by the communication channel. In an example, a communication channel can be interrupted by the orbit of satellites in the satellite network, which may enable a satellite to remain in communication range of a computing device for only minutes at a time. In another examples, a communication channel can be interrupted by the mobility of a computing device, which may cause the computing device to move in and out of communication range of satellites in the satellite network one or more times during a communication session. In yet another example, environmental conditions, such as weather or signal obstructing geography or architecture, can frequently interfere with LOS communication between the satellite network and a computing device. Such interruptions or interference can make it difficult to establish or maintain communication sessions that are suitable for some applications, such as applications that require high throughput and low latency communication.

One technique for addressing issues associated with ephemeral or transient nature of communication channels established between a satellite network and a computing device includes serial handover of a communication session from a first communication channel that is established with a first satellite to a second communication channel that is established with a second satellite. From the perspective of the computing device, the handover process includes closing or terminating an existing communication channel with the first satellite and identifying and establishing a communication channel with the second suitable satellite. A suitable satellite includes a satellite that supports a communication channel that meet communication quality requirements or objectives (e.g., a bandwidth, throughput, latency, or session interruption requirement) of an indicated communication session. A handover can be executed in response to a detected or anticipated change in the communication quality of the first communication channel. In an example, a handover from the first satellite to the second satellite can be triggered in response to the computing device (e.g., a laptop or a smart telephone) moving out of a geographic area that is served by the first satellite. In another example, a handover from the first satellite to the second satellite can be initiated in response to signal fading or an increase in an error rate, such as a bit error rate (BER), of a communication channel between the computing device and the first satellite.

Serial handovers can be expensive in terms of the time and computing resources needed to identify a suitable satellite and to establish a communication channel with the identified satellite. In an example, a computing device may have to poll, and contend for access to, several satellites before finding a satellite that is suitable for executing a handover operation. Once a suitable satellite is identified, a computing device can be blocked from establishing a communication channel with the identified satellite if there are no available channels in a frequency band that is prescribed for communication between the satellite and the computing device. Such polling, contention, and blocking can introduce delays into a handover process. Such delays in the handover process can degrade the communication quality of a communication session, such as by causing a session to be dropped (e.g., in situations where a new communication channel cannot be established before an existing channel is lost or becomes unusable) or by introducing latency to, or causing interruptions in, data streams associated with a communication session. Such delays in a handover process can also prolong or exasperate the effect of other events that trigger the handover process. In an example, under circumstances where a handover is triggered due to poor signal quality, such as indicated by increased error rates caused by channel fading or signal interference, delays in the handover process can increase computational resources and the energy required to compensate for the errors, and in some cases may result in unacceptable interference with a communication session.

Aspects of the present disclosure are based on the realization that a communication channel established between a single satellite in a satellite network and a computing device may not achieve a communication objective of the computing device or a communication session between an application executing on the computing device. In an example, a communication objective includes a target or prescribed minimum communication channel bandwidth, throughput, span of time without interruption, or any other suitable metric. In another example, a communication objective includes a target of prescribed maximum tolerated latency, number of interruptions, or error rate, or other suitable metric. In either of these examples, a communication channel between a single satellite in a satellite network and a computing device may be un able to achieve the communication objective or may only satisfy a communication objective for a nominal span of time (e.g., 5 minutes while an orbit of a satellite places the satellite in LOS communication range of a computing device). The deficiencies in that communication channel can due to resource limitations of the satellite, the orbital trajectory of the satellite, movement or displacement of the computing device, or adverse environmental conditions. In an example, the satellite may not be configured with radio communication hardware or software for achieving an indicated minimum bandwidth requirement. In another example, the orbit of the satellite or the configuration of the satellite network (e.g., the distributions of satellites, relay stations, or network control centers) may require routing and buffering techniques that cause communication latencies that exceed a maximum tolerated latency of a communication session.

Aspects of the present disclosure are based on the recognition that communication between a satellite network and a computing device can be improved by concurrently, or simultaneously, communicating with a cluster of satellites, thereby increasing the probability that the computing device maintains an effective communication channel with the satellite network that satisfies a target communication objective or communication quality requirement (hereinafter, "communication objective") of a communication session. Such improvements solves, or mitigates the problems associated with, the technical problem of communicating with a satellite network to achieve an indicated communication objective using satellites having limited resources and in potentially adverse environments with the technical solution of cause a computing device to communicate concurrently, or to establish and maintain concurrent communication channels, with two or more devices of a cluster of satellites in a satellite network. In an example, a satellite cluster can be formed by selecting satellites based on known orbital trajectories of the satellites, the current or anticipated location of the computing device, or the time of day, communication bandwidth supported by the satellite, or latencies, error rates, throughputs, or any other suitable metrics that are associated with the satellites or communication channels established with the satellites and a useful for determining whether a communication session, or communication of a communication channel, achieves a communication objective. Concurrent communication channels between the satellite cluster and the computing device can be established on the basis of this information to achieve an indicated communication objective. In an example, such information is used to establish concurrent communication channels to mitigate the problems that are associated with handovers, such as by minimizing or reducing the likelihood or frequency of handovers. Such channels can obfuscate, reduce, or eliminate any perceived (e.g., with respect to a communication session) latency or delay associated with communication session handovers, such as by increasing the likelihood that one or more alternate or supplementary communication channels are available to maintain communication with the satellite network when another channel becomes unavailable. In an example, such information is used to establish concurrent communication channels to achieve a bandwidth requirement of a communication objective, such as by using the bandwidth of two or more communication channels formed between satellites to achieve the bandwidth requirement. In other examples, such information is used to establish concurrent communication channels to achieve any indicated communication objective, such as by concurrently using the resources of two or more satellites to achieve the objective, or by using the resources of a first set of one or more satellites to achieve the communication objective while keeping the communication resources of a second set of one or more other satellites available, and using those resources, to compensate for any deficiencies in the resources first set of satellites.

The present disclosure includes techniques (e.g., systems, devices, processes, or non-transitory computer readable storage media) for improving communication with a satellite network, such as by causing a computing device to concurrently communicate with a cluster of two or more satellites. In an example, the techniques includes determining the location of a computing device, such as ground-based or mobile computing device, that includes at least one data communication interface that is configured to wirelessly communicate with a satellite network. The techniques further include identifying a cluster of two or more satellites (hereinafter, "satellite cluster") for the computing device to communicate with to achieve a communication objective, such as in an environment where the location of the computing device changes relative to satellites in the satellite network. In an example, the communication objective includes a communication channel quality criterion, such a BER below a threshold value or a target data rate. In another example, the communication objective includes a communication session criterion, such as keeping communication latency or interruptions below a threshold value during a communication session. The satellite cluster can be selected based on the location of the computing device, the orbital path or trajectory of the satellites in the satellite network, the time of day, data that is indicative of the communication quality of communication channels that are established with the satellites, or communication quality of communication sessions that are supported or carried by the satellites. The technique further includes causing the computing device to communicate concurrently with the two or more satellites of the satellite cluster to achieve the communication objective. The techniques further include monitoring such communications to identify data that is indicative of the communication quality of the communications, such as to determine whether the communications meet a criterion associated with the communication objective. The technique additionally include dynamically adjusting the satellite cluster, or the two or more satellites with which the computing device concurrently communicates, such as by adding one or more satellites to, or removing one or more satellites from, the satellite cluster based on the determination of whether communication with the satellite cluster achieves the communication objective or to satisfy a criterion associated with the communication objective.

Referring to the figures, FIG. 1 illustrates components of a system 100 for satellite data transmission clustering with dynamic clusters, according to some examples of the present disclosure. The system 100 includes a satellite network 115, data communication network 120 and 125, a computing device 135, and computing server 145. In an example, the system 100 also includes one or more computing systems that associated with a satellite network relay station 155 or a satellite network control station 150.

The satellite network 115 includes two or more satellites that are configured to wirelessly communicate with one or more computing device, such as by transmitting and receiving radio signals in a prescribed radio frequency band of the electromagnetic spectrum. In an example, such communication includes receiving packet switched data from, or transmitting packet switched data to, the computing device. In another example, such communication includes exchanging packet switched data between the computing device and one or more data communication networks, such as the data communication network 120 or 125. In an example, the satellite network includes low earth orbiting satellites, such as telecommunication satellites that orbit between 500 kilometers and 2,000 kilometers of the surface of the earth. In another example, the satellite network 115 includes telecommunications satellites that are located at other orbital altitudes. Each satellite in the satellite network 115 can orbit the earth along a prescribed trajectory 150 and may be configured to provide telecommunications service to computing devices that are within LOS radio communication range during the precession of the satellite through its orbit.

In an example, each satellite of the satellite network 115 is associated with, or generates, data that is indicative of the health, current or projected trajectory, and timing of the satellite (hereinafter, ephemeris data). Such ephemeris data can be communicated to the satellite network control station 150, or to any computing system that is configured to receive such information. In another example, the satellites are also associated with, or generates, data that is indicative of the quality of communications with the satellites (hereinafter, "communication quality data"). This information can be communicated (either directly or through some other means) to the computing devices that communicate with the satellites. A satellite can generate such communication quality data by sampling and monitoring the signal quality of communication signals received at the satellite or by tracking errors detected in packets received at, or transmitted from, the satellite. In an example, the communication quality data is communicated to the satellite network control station 150, or to any computing system that is configured to receive such information.

A satellite in satellite network 115 is configured to communicate with computing devices, such as the computing device 135, by establishing one or more communication channels between the satellite and the computing device within a prescribed radio frequency band. Such communication channels can be established using any suitable shared communication media access control technique, such as time division multiplexing or frequency division multiplexing. In an example, two or more satellites can be configured to communicate with computing devices using a common set of frequencies by coordinating the partitioning the frequency band into distinct time division or frequency division communication channels and allocating the communication channels amongst the computing devices. Such coordinating can include allocating a subset of the communication channels to each satellite. A satellite can generally communicate with a computing device while the satellite is within radio communication range (e.g., LOS ration communication range) of the computing device and while a there is an unused communication channel available.

Due to the low orbit of the in the satellites in the satellite network 115, a satellite may only be within radio communication range of a computing device, or an indicated service area, for short amount of time (e.g., as little as 5 minutes at a time). When the satellite network 115 anticipates that a satellite that currently has an established communication channel with computing device is about to leave a service area, or that the computing device itself is about to leave the service area, the satellite network can trigger a handover process. In an example, the handover process includes transferring a communication session that is established over a communication channel between a computing device and a first satellite to another communication channel, such as by using a communication channel that is allocated to a second satellite to establishing a new communication channel between a second satellite and the computing device and transferring communications to the new communication channel. Generally, a handover is unsuccessful if there is no communication channel available for communicating with the second satellite. In such a scenario, the handover is delayed, resulting in blocking or forced termination of the communication session. Frequent handovers, such as caused by the low (e.g., rapid) orbit of the satellites in the satellite network 115 and mobility of the computing device can consume data communication bandwidth and increase communication latency.

The data communication network 120 or 125 can include any packet switched data communication network that is configured to exchange electronic data between two or more computing devices. In an example, the data communication network 120 or 125 is an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. In an example the satellite network is a component of, or is configured to interface with or exchange information between, the data communication network 120 or 125. In an example, the data communication network 120 or 125 includes the satellite network 115.

The computing device 135 can include any computing system or data communication resource that is configured to establish concurrent communication channels with two or more satellites of the satellite network 115. In an example, the computing device 135 includes a computing system, such as a laptop, a smartphone, a tablet computer, or any other computing device that is configured with that is configured with a satellite communication transceiver. In an example, the satellite transceiver is configured to concurrently communicate with two or more satellites of the satellite network 115. In an example, the satellite transceiver is configured to concurrently establish distinct communication channels with each of two or more satellites 115 using common or distinct frequencies or frequency bands.

The computing device 135 can be configured with one or more software applications that are configured to establish a communication session with a remote computing system or computing device, such as the computing server 145. In an example, the computing device 135, or a software application executing on the computing device, is configured to achieve a communication objective of a communication session, such as by identifying and executing a satellite handover process that is consistent with achieving the communication objective. In an example, determining the satellite handover process includes identifying satellites, or clusters of satellites, to concurrently communicate with to mitigate the data communication penalties associated with satellite handovers, as described herein.

In an example, the computing device 135 includes with a location or position determining device, such as a global positioning system (GPS), to determine the location of the computing device with respect to an indicated coordinate system. In other examples, the location of the computing device 135 can be identified by a separate positioning device, such as a GPS device located in the vehicle 130 and communicated to the computing device 135. In another example, the position of the computing device 135 can be determined by the satellite network or the data communication network 120 or 125, such as though radio signal triangulation or other suitable techniques and communicated to the computing device 135. Determining the location of the computing device 135 can include determining a displacement trajectory of the computing device.

The computing device 135 is configured to determine the communication quality of a communication channel established between the computing device 135 and a satellite in the satellite network 115. In an example, determining the quality of the communication channel can include sampling communication signals received at a satellite transceiver of the computing device 135, such as to identify signaling issues (e.g., noise, fading, or poor signal strength) that can interfere with the communication channel. In another example, determining the quality of the communication channel can also include determining the BER, the packet retransmission rate, or the packet drop rate at the computing device 135 or at a satellite in the satellite network 115. In yet another example, determining the quality of the communication channel includes receiving a message from the satellite with information on the parameters of a communication signal or the communication channel (e.g., bandwidth, signal-to-noise ratio, error rate, network or satellite load, etc.).

The computing server 145 includes any computing system that is configured with hardware or software components for interfacing with the satellite network control station 150, the computing device 135, or the satellite network 115. In an example, the computing server 145 is configured with one or more software applications or hardware circuits to implement the techniques described herein. In an example, the computing server 145 includes as a network interface to the data communication network 120 or 125, to identify (e.g., retrieve or obtain) satellite ephemeris data or data that is indicative of the channel quality at one or more satellites of the satellite network 115. In another example, the computing server 145 includes as a satellite transceiver to communicate with satellites of the satellite network 115 to retrieve or identify satellite ephemeris data or data that is indicative of the communication quality (e.g., channel communication quality or session communication quality) at one or more of the satellites. In yet another example, the computing server 145 includes as a network interface to the data communication network 120 or 125 or a satellite transceiver to communicate with satellites of the satellite network 115, such as to obtain or identify data that is indicative of the communication quality of a communication channel established between the computing device 135 and the satellites 115. Such data can be captured at the computing device 135 and communicated to the computing server 145 using the satellite network 115 or the data communication network 120 or 125. The ephemeris data, the data that is indicative of the channel quality at one or more satellites of the satellite network 115, or the communication channel quality data provided by the computing device 135 can be stored in a database locally at the computing server 145 or remotely on another computing system or computing environment, such as in a cloud computing or hosted computing environment. The computing server 145 can further include applications or hardware circuits for processing this data according to the techniques described herein.

In an example, the computing server 145 is configured to host communication sessions between one or more computing devices, such as the computing device 135, or between one or more computing device and the computing server. In an example, a server application, such as social media application or an electronic meeting or remote collaboration application, is configured to execute on the computing server 145 to enable one or more remote computing device to establish a communication session with the computing server 145. In an example, the server application is configured to operate as an interface between two or more communication sessions, such as to enable distinct computing devices that are associated with each session to share a common resource, such as a share an electronic meeting or remote collaboration network environment. In another example, the computing server 145 is configured to operate as a bridge or relay, such as to couple or forward a communication session from a computing device 135 to another computing device.

In an example operation, the computing server 145 identifies a location of a computing device, such as the computing device 135, that is configured to communicate with the satellite network 115. In an example, the computing server 145 identifies the location of the computing device by obtaining or receiving data that is indicative of the location of the computing device and extracting the location from the received data. The location data can include cartesian coordinates, such as obtained for a GPS device, a postal or governmental address, or any other data that is indicative of the location of the computing device. In an example, the location data is received or obtained from the computing device over a data communication network, such as the data communication network 120 or 125. In another example, the location data is received or obtained from one or more satellites of the satellite network 115. In another example, the location data is received or obtained by extracting the location data from other data that is indicative of a prescribed route to be traversed by the computing device. Such data can include scheduling information associated with the prescribed route and timing data, such as data that is indicative of the current time of day.

Continuing with the example operation, the computing server 145 identifies data that is indicative of an orbital trajectory or path of two or more satellites in the satellite network 115 (hereinafter, "satellite path data" or "path data"). In an example, the computing server 145 identifies the path data by obtaining or receiving satellite ephemeris data from the satellite network control station 150 (e.g., from a computing system associated with the satellite control station) or from one or more satellites in the satellite network 115. The computing server 115 then extracts the location data and associated timing data from the satellite ephemeris data, such as by parsing or processing by any suitable means, a data structure that includes ephemeris data. In an example, the location data and associated timing data is indicative of a location in orbit where the satellites will be located at a given time of date. In another example, the location data and associated timing data is indicative of a coverage area (e.g., a terrestrial coverage area) where the satellites provide data communication service at an indicated time of day or within an indicated span of time.

Continuing with the example operation, the computing server 145 identifies data that is indicative of the quality of one or more communication channels associated with two or more satellites in the satellite network 115 (hereinafter, "satellite quality data" or "satellite communication quality data"). In an example, the computing server 145 identifies the satellite quality data by receiving or obtaining the data from the satellite network control station 150, one or more satellites in the satellite network 115, or from a remote computing system such as the computing device 135. In another example, the computing server identifies the satellite quality data by receiving or obtaining the data from a database of previously identified satellite quality data (hereinafter, "historic satellite quality data"). In an example, the satellite quality data includes data that is indicative of a BER, packet drop rate, noise level, or any other value or metric that is suitable for determining the quality of a communication channel. In another example, the satellite quality data includes data that is indicative of load or utilization rate of the satellites, such as the number of available communication channels current being used by a satellite relative to the total number of communication channels allocated to the satellite. In yet another example, the satellite quality data includes data that is indicative of satellite communication channel throughput, congestion level, latency, or available bandwidth. In some examples, the satellite quality data includes predicted or anticipated satellite quality data. Such predicted or anticipated satellite quality data can be derived from historic satellite quality data and one or more logical or analytical satellite communication channel models that are configured to predict or model the operation of a satellite communication channel. In some examples, the satellite quality data or the historical satellite quality data is provided by the computing device 135, the computing server 145, the satellite network relay station 155, or the satellite network control station 150. In other examples, the satellite quality data or the historical satellite quality data is crowdsourced from one or more of these devices, entities, or computing systems associated with these entities.

Continuing with the example operation, the computing server 145 identifies a communication objective of the computing device 135. In an example, the communication objective includes, or identifies, a criterion for a communication session (e.g., a planned or established communication) between the computing device 135 and the satellite network 115 or between the computing device and another computing device that is coupled to the satellite network 115 or the data communication network 120 or 125. In another example, the communication objective includes, or identifies, a criterion for a communication session between the computing device and the computing server 145. In an example, the communication session includes a communication session between the computing device 135 and a server application that is configured to execute on the computing server 145, as described herein. Identifying the communication objective can include obtaining or receiving data that is indicative of the communication objective from the computing device 135 or an application executing on the computing server 145. Identifying communication objective can also include determining the communication objective based on the type of data (e.g., video, audio, realtime communication streams, etc.) exchanged during the communication session, or based on the type of application that hosts the communication session.

A criterion for a communication session can include one or more communication session threshold requirement, such that a communication session parameter or metric (e.g., any parameter of metric associated with the quality of communication session or communication channel) that fails to meet the threshold fails to achieve the communication objective. A communication session parameter or metric meets a threshold that identifies an upper or maximum tolerable limit by maintaining a value that is at or below the limit. A communication session parameter or metric meets a threshold that identifies a lower or minimum tolerable limit by maintaining a value that is at or above the limit. In an example, the criterion identifies a maximum rate, or number, of interruptions, such as handovers or interruptions associated with handovers, that are allowable or tolerable during a communication session. In another example, the criterion includes maximum allowed or tolerated bit or packet error during the communication session. In another example, the criterion includes a minimum bandwidth or a maximum latency tolerated by the communication session.

In another example, the criterion for a communication session includes a security criterion supported, or required, by the communication session. A security criterion can be supported by a communication session when the communication session satisfies bandwidth, throughput, error rate, or latency requirements associated with the security criterion. A security criterion can also be supported by a communication session when the communication session, or a data communication network that supports the communication session, satisfies channel allocation requirements associated with a security criterion, such as a security criterion that requires data communication be allowed or partitioned amongst two or more communication channels.

In another example, the criterion includes an energy criterion, such as a requirement that energy that is consumed by data communication during the communication session is below a threshold energy level. In an example, an energy criteria can be met by reducing energy expended on frequent handovers or data retransmissions, such by reducing the number or frequency of handovers or data packet retransmissions (e.g., by communicating with satellites that have low error or packet drop rates). In another example, the energy criterion can be met by satellites, or by communication channels formed with satellites, that a are configured to use a radio communication modulation scheme or a communication protocol that limits or reduces consumed energy as compared to other modulation schemes or a communication protocols. In yet another example, the energy criterion can be met by satellites, or by communication channels formed with satellites, whose received signal strength is above an indicated threshold power level, thereby reducing the amount of power used to transmit information to, or receive information from, with the satellites.

Continuing with the example operation, the computing server 145 selects, or forms a cluster (e.g., cluster 105) with a first set of two or more satellites from the satellite network 115 to communicate with the computing device 135 during the communication session. In an example, the first set of satellites is selected based on the identified location data and path data, such as to select satellites that will have a service area that coincides with the current or planned location of the computing device 135 at an indicated time of day. Such planned location can be determined by any suitable means, such as current movement information (e.g., the position, heading, or speed of the computing device 135) or route guidance information obtained from a GPS device.

Continuing with the example operation, the computing server 145 selects a subset of two or more satellites from the first set of satellites based on a determination that satellite quality data for the subset of satellites indicates that communication with the satellites achieves (or will likely achieve) the communication objective or meets the criterion associated with communication objective (hereinafter, "achieve the communication objective") for at least a threshold span of time.

Continuing with the example operation, the computing server 145 causes the computing device 135 to concurrently communicate with at least two satellites in the subset of satellites. In an example, the computing server 145 causes the computing device 135 to concurrently communicate with at least two satellites in the subset of satellites by providing the subset of satellites to the computing device 135, such as by transmitting data that is indicative of the subset of satellites to the computing device. In such an example, the computing device 135 automatically establish concurrent communication with satellites in the subset of satellites, such as by establishing distinct communication channels with each satellite of the subset of satellites. In an example, the computing server 145 causes the computing device 135 to concurrently communicate with at least two satellites in the subset of satellites by providing data that is indicative of the subset of satellites to a computing system or data storage system that is accessible to the computing device 135 and configuring the computing system, such as through programming of the computing device or through execution of an application on the computing device, to automatically retrieve the data and establish concurrent communication channels with the subset of satellites. In an example, the computing system or data storage system can be disposed along a planned route of the computing device 135, such as at relay stations 155 or at one or more proxy servers. In an example, the computing device 135 is configured to automatically establish concurrent communication channels with the two or more satellites of the subset of satellites in response to obtaining the data that is indicative of the subset of satellites or in response to a triggering event, such as a change in the communication quality of a communication channel established between the computing device and the satellite network 115. Such events can include a change in the relative distance or elevation angel between the computing device 135 and satellites of the satellite network 115.

Continuing with the example operation, the computing server 145 identifies data that is indicative of the quality of one or more communication channels between the computing device 135 and one or more satellites of the subset of satellites. Such satellite quality data can be indicative of the quality the communication between the computing device 135 and the satellite network 115. Such satellite quality data can be identified by obtaining or receiving the data from the computing device 135 or from the satellite network 115, as described herein.

Continuing with the example operation, the computing server 145 determines, based on the satellite quality data, that the communication quality of the communication session does not achieve the communication objective (e.g., one or more communication channels between the computing device 135 and one or more satellites of the subset of satellites does not meet the criterion associated with the communication objective). Responsive to determining that, the communication quality of the communication session does not meet the communication objective, computing server 145 modifies the subset of satellites by adding or removing one or more satellites to improve the quality of the communication between the computing device 135 and the satellite network 115 to meet the criterion. The computing server 145 then causes the computing device 135 to continue the planned communication by concurrently communicating with at least two satellites in the modified subset of satellites (e.g., cluster 110). In an example, the at least two satellites in the modified subset of satellites differ in at least one satellite from the at least two satellites in the subset of satellites that were previously used to form concurrent communication channels with the satellite network 115.

While aspects of the example operation are described based on the operation of the computing server 145, one or more of the described aspects can be performed by other components of the system 100, such as the computing device 135. In an example, the computing device 135 obtains the satellite information from the satellite network 115 or from the computing server 145, and selects the first set, the subset, or the modified set of satellites based on the indicated technique. The computing device 135 can then automatically establish concurrent communication channels with the subset of satellites or the modified set of satellites.

Figure 2:
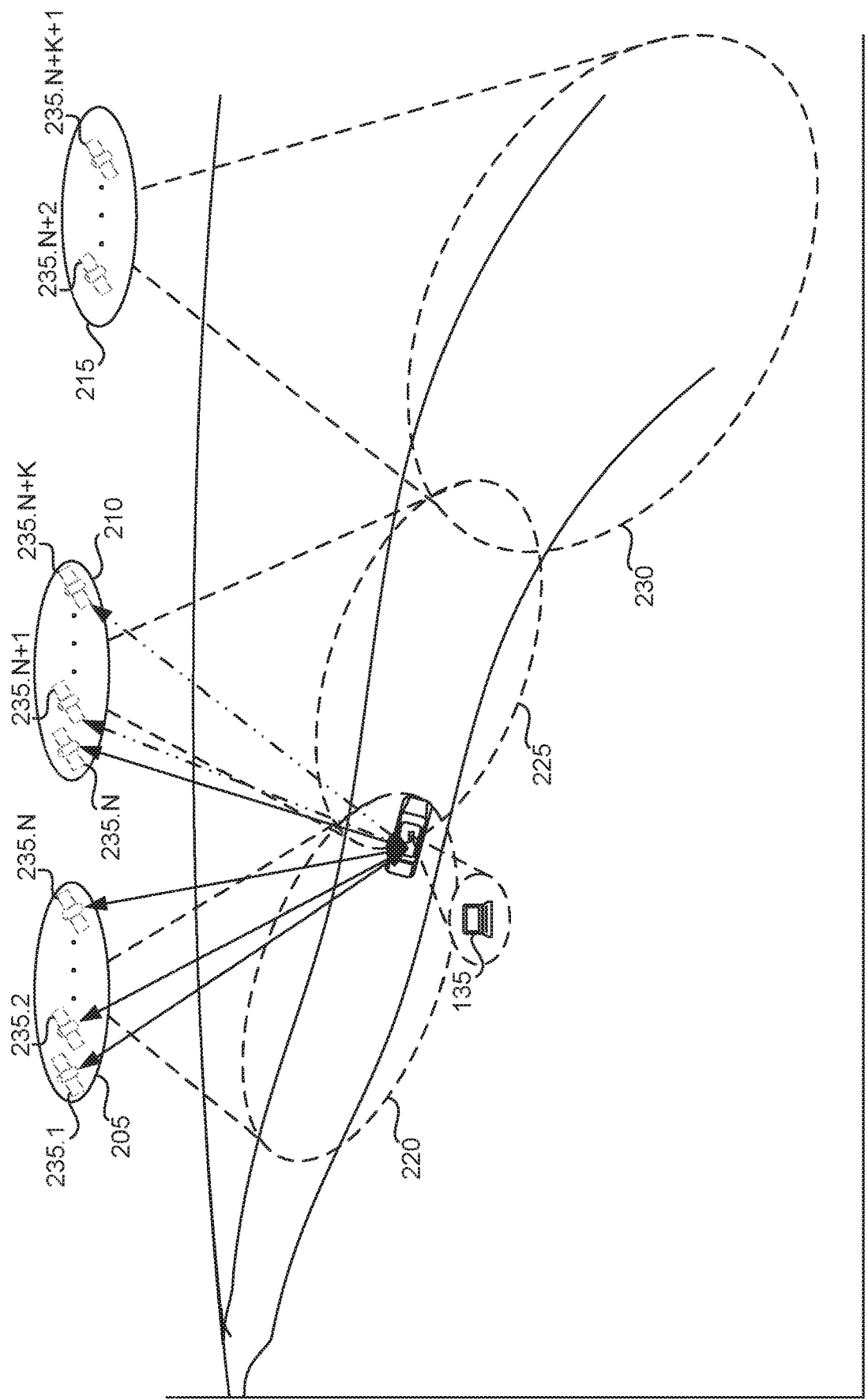
FIG. 2 illustrates an example of satellite data transmission clustering with dynamic clusters, according to some examples of the present disclosure.

FIG. 2 illustrates an example of satellite data transmission clustering with dynamic clusters, according to some examples of the present disclosure. In the example shown in FIG. 2, a computing device 135 is configured to concurrently communicate with two or more satellites of a satellite cluster, such as to improve the quality of communications between the computing device and the satellite network. The computing device 135 is further configured to dynamically change the one or satellites (e.g., select different satellites with which to concurrently communicate), or the cluster of satellites (e.g., switch to a different or modified cluster), in response to a current or anticipated change in the quality of communications with the satellites. Such communication techniques can increase the likelihood that data is communicated to satellites that are within a threshold range of the computing device 135, or satellites that satisfy can achieve a communication objective, as described herein.

According to the example shown in FIG. 2, a computing device 135 concurrently communicates with two or more satellites 235.1 and 235.2-235.N of a first satellite cluster 205, such as by establishing and maintaining distinct communication channels between the computing device and each of the two or more satellites. In an example, the computing device 135 forms the satellite cluster 205 by selecting satellites to include in a satellite cluster based on a communication objective and information obtained from a database of satellites and associated satellite data (e.g., satellite ephemeris data or satellite communication quality data). In an example the computing device 135 forms the satellite cluster, or selects satellites to include in the satellite cluster, based a current or anticipated location of the computing device or the time of day. The database of satellites and associated satellite data can be generated or provided by a remote server, such as a proxy server or the computing server 145, the network control center 140, the relay station 155, or any other remote computing system having access to such information. In another example, the computing device 135 obtains the satellite clusters (e.g., a database of satellites, associated satellite data, and cluster assignments for each satellite) from the computing server 145, as described herein. In an example, the computing device 135 obtains a databased of satellite clusters and associated timing or location information from the computing server 145. In an example, each satellite cluster that is provided by, or obtained from, the computing server 145 is associated with a time of day at which the cluster can is useful for achieving the communication objective, such as through the establishment and maintenance of concurrent communication channels with the computing device 135. Each satellite cluster that is provided by the computing server 145 may also be associated with a location or service area where the cluster can is useful for achieving the communication objective. In an example, the database of satellites and associated satellite data or the databased of satellite clusters are provided to the computing device 137 using an application layer protocol or by an application that is configured to communicate using, or establish communication sessions that use, one or more communication modality, such as speech, video, or realtime data, etc.

The computing device 135 concurrently communicates with the two or more two or more satellites 235.1 and 235.2-235.N of the first satellite cluster 205 by establishing a distinct communication channel with each of the two or more satellites and using the communication channels to communicate data of a communication session. In an example, the computing device 135 establishes a first communication channel with a first satellite 235.1 and a second communication channel with a second satellite 235.N, such that the first communication channel and the second communication are both allocated to, or associated with, the computing device during the same span of time. The computing device 135 then determines a technique for concurrently maintaining or communicating information over the first communication channel and the second communication channel to achieve the data communication objective.

In an example, the computing device 135 determines that the communication objective can be achieved by communicating communication session data over the first channel while keeping the second channel open (e.g., allocated to the computing device but not communicating communication session data). In such example, the computing device 135 concurrently communicates with the satellites by communicating communication session data over the first channel while only communication a sufficient or minimum required amount of information, such as prescribed by a suitable satellite communication protocol, over the second channel to keep the channel open.

In an example, the computing device 135 determines that the communication objective can be achieved by multiplexing the communication of communication session data over the first channel and the second channel. In such example, the computing device 135 partitions the communication data session data into first data and second data according to a prescribed data partitioning or multiplexing technique, and concurrently communicates, or causes the concurrent communication of, the first data over the first communication channel and the second data of the second communication channel. In an example, the first data includes user data and the second data includes information for correcting errors in the user data. In another example, both the first data and the second data include one or more of user data or error connection data. In an example sequence numbers, or other identifiers can be associated with the first data (e.g., a first data packet) and the second data (e.g., a second data packet).

In an example, the computing device 135 determines that the communication objective can be achieved by redundantly communicating communication session data over the first channel and the second channel. In such example, the computing device 135 concurrently communicates, or causes the concurrent communication of, redundant (e.g., identical) communication session data over the first and second communication channels.

In an example, the computing device 135 determines that the communication objective can be achieved by communicating first data over the first communication channel to meet a first criterion of the communication objective and communicating second data over the second communication channel to meet a second criterion of the communication objective. In an example, the first data is associated with a first communication modality, such as speech or video, and the second data is associated with a second communication modality that differs from the first communication modality. Responsive to the determination, the computing device 135 concurrently communicates, or causes the concurrent communication of, the first data over the first communication channel and the second data of the second communication channel.

In an example, a remote computing device or computing system associated with the communication session can receive communication data that is transmitted to the satellite network over two or more concurrent communication channels and process the received data, such as by using a data integration technique that is associated with the prescribed data partitioning used by the computing device 135 technique to integrate the received data into a coherent data stream of a communication session. In an example where the computing device 135 determines that the communication objective can be achieved by multiplexing the communication of communication session data over the first channel and the second channel, the remote computing device or computing systems identifies sequence numbers associated with packets received over the first communication channel and sequence numbers associated with packets received over the second communication channel. The packets, or data included in the packets, can then be combined according to the identified sequence numbers, such as to determine the coherent data stream or a combined sequence order of the received data.

Continuing with the example shown in FIG. 2, the computing device 135 dynamically adjusts, or change, the satellites that are included in the satellite cluster 205, such as in response to a detected on anticipated change in the quality of communications with the cluster. In an example, the detected or anticipated change includes a satellite or the computing device 135 leaving the coverage area 220. In an example, the detected or anticipated change includes detected or anticipated signal interference, such as caused by an architectural and environmental obstruction of line of sight communications between the computing device 135 and the satellite cluster 205. Dynamically adjusting the satellite cluster 205 can include adding or removing one or more satellites to form a new satellite cluster. In an example, the satellite cluster 205 can be dynamically adjusted (e.g., during a communication session) by replacing all satellites of the cluster except satellite 235.N with satellites 235.N+1 through 235.N+K to form the adjusted satellite cluster 210 having a coverage area 225. In another example, the computing device 135 can adjust the adjusted satellite cluster 210 to form another adjusted cluster 215 having coverage area 230, by removing satellite 235.N+1 and adding satellite 235.N+K+1. In another example, the computing device 135 obtains the adjusted clusters 210 or 215 from the a databased of satellite clusters and associated timing or location information provided by the computing server 145.

Adjusting a first satellite cluster to form a second satellite cluster may include handing over a communication session from a satellite that is removed form a cluster to a satellite that is added to a cluster. The computing device 135 may mitigate penalties associated with such handovers by maintaining communication with at least one satellite that is common to both the first satellite cluster and the second satellite cluster.

Figure 3:
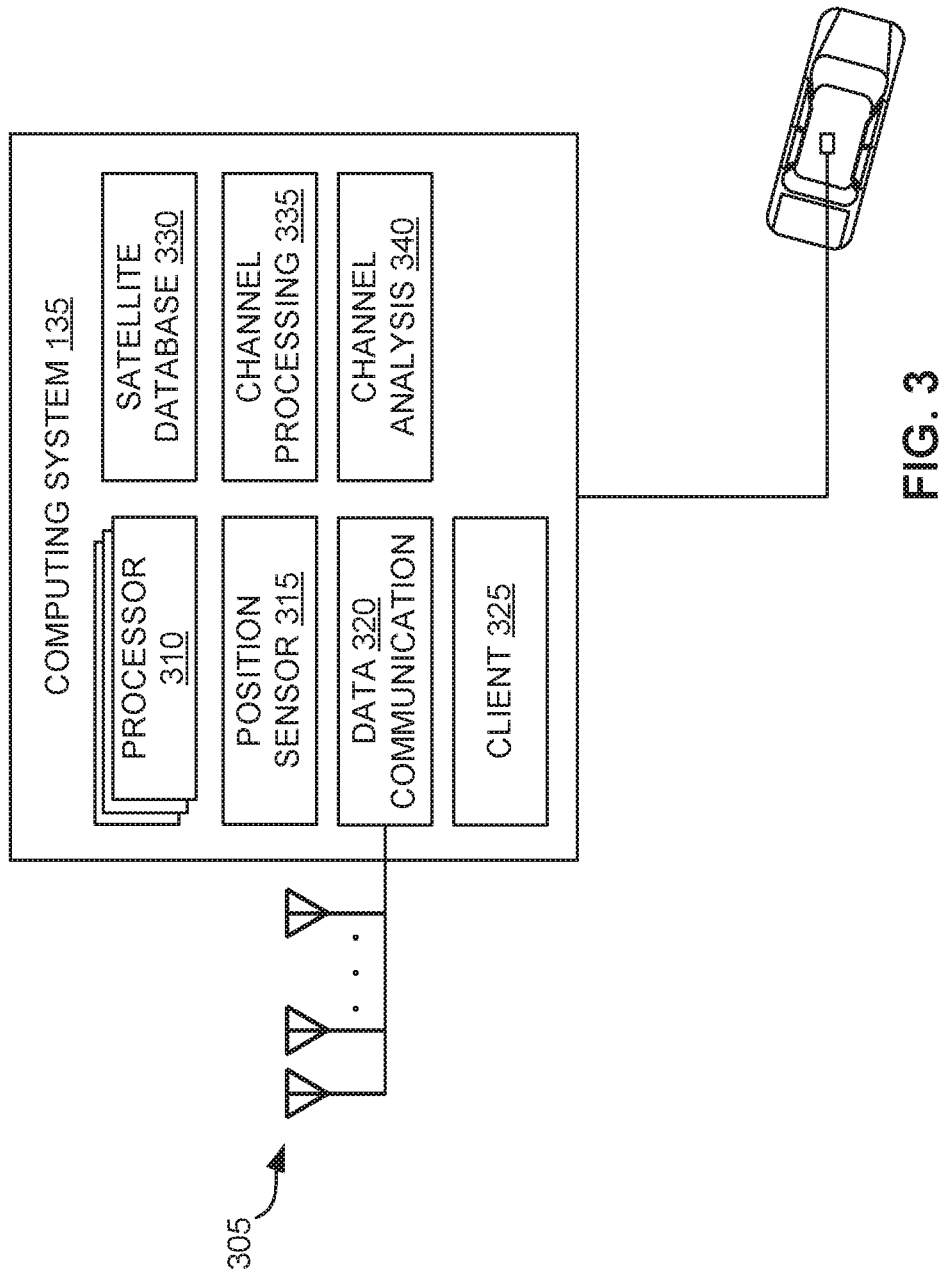
FIG. 3 illustrates an example of a computing device that is configured for satellite data transmission clustering with dynamic clusters, according to some examples of the present disclosure.

FIG. 3 illustrates an example of a computing device 135 that is configured for satellite data transmission clustering with dynamic clusters, according to an example of the present disclosure. In an example, the computing system includes antenna 305, processor 310, position sensor 315, data communication component 320, client component 325, database component 330, channel processing component 335, and channel analysis component 340. The components of the computing device 135 are configured to operate and communicate with each other to implement the techniques described herein. In an example, the components of the computing device 135 communicate, such as to exchange data, control signals, or other information, using a hardware interconnect fabric (e.g., a data communication bus) and one or more inter-process communication techniques (e.g., shared memory spaces, operating system sockets, message passing, etc.).

The antennas 305 includes one or more antennas for concurrently communicating with a cluster of two or more satellites, as described herein.

The processor 310 is configured to execute one or more software applications that include computer executable to implement the techniques described herein. Such software applications can include software application that are associated with the client component 325, database component 330, channel processing component 335, route component 340, and channel analysis component 345.

The position sensor 315 includes sensors, such as a global positioning sensor, for determining the location of the computing system 135.

The data communication component 320 includes or more hardware data communication interface, such as satellite transceiver or a wired or wireless data communication network interface, that is configured to establish and maintain concurrent communication channels between two or more satellites. In an example, the data communication component 320 is configured to sample communication signals changed between the computing device 135 and the satellites to identify or detect communication signal interference. The data communication component 320 is further configured to provide information derived from the sampled signals to one or more other component of the computing device 135 to determine and monitor the communication quality of the communications channels.

The client component 325 includes one or more software applications that are configured to establish or maintain a communication session with a server application, such as an electronic meeting or remote collaboration application, that is configured to execute on a remote computing system, such as the computing server 145. In an example, the client component 325 is configured to obtain satellite data or satellite cluster information from the computing server 145 or from the satellite network 115. In another example, the client component 325 is configured to operate with one or more components of the computing system 135 to form or identify a satellite cluster, concurrently communicate with two or more satellites of the satellite cluster, and dynamically adjust the satellite cluster based on a detected or anticipated change in communication quality, as described herein.

The database 330 includes one or more hardware or software components of a database system, such as storage devices and database management applications, that obtains, stores, and provides access to satellite data, satellite cluster data, and associated location and timing information obtained from the computing server 145, the satellite network 115, or the satellite network control station 150.

Channel processing component 335 includes one or more hardware circuits or software applications that are configured to process data obtained from, or transmitted over, a communication channel. In an example the channel processing component is configured to implement one or more prescribed data partitioning or redundant communication techniques for concurrently communicating session data over two or more data communication channels. In another example, the channel processing component 335 is configured to process partitioned or reductant data obtained from two or more satellites of a satellite cluster based on a prescribed data partitioning or redundant communication techniques, such as to generate an integrated stream of session data.

The channel analysis 340 includes one or more hardware circuit or software application that is configured to received channel quality data captured by the data communication component 320 and channel data obtained by the channel processing component 335 to determine whether communications with one or more satellites of a satellite cluster or a satellite network achieve or deviate from a session communication objective, as described herein.

Figure 4:
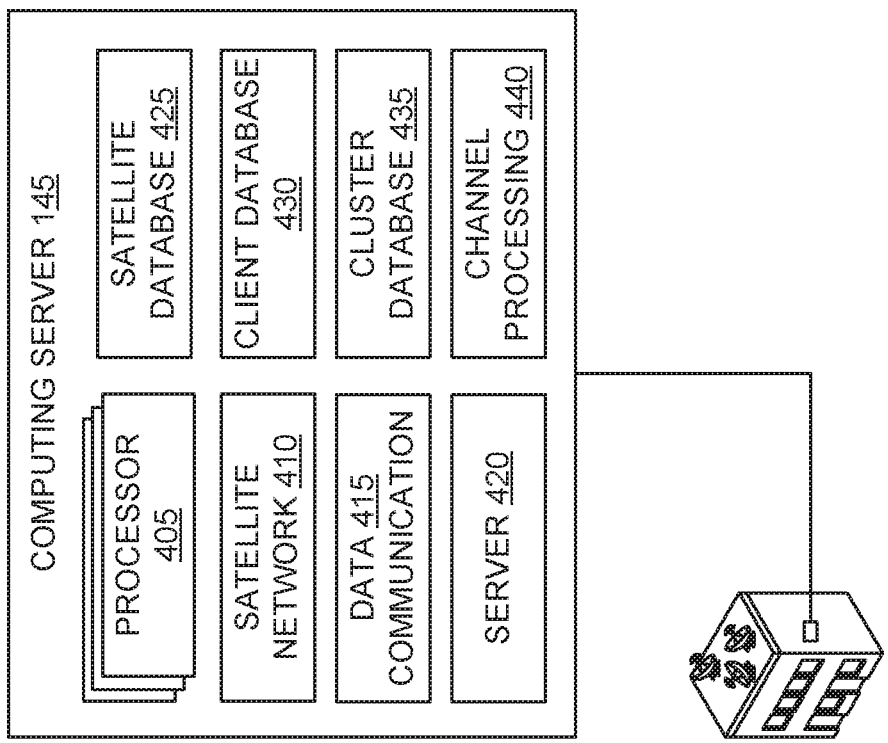
FIG. 4 illustrates an example of a computing server that is configured for satellite data transmission clustering with dynamic clusters, according to some examples of the present disclosure.

FIG. 4 illustrates an example of a computing server 145 that is configured for satellite data transmission clustering with dynamic clusters, according to some examples of the present disclosure. In an example, the computing server 145 includes a processor 405, satellite network interface 410, data communication interface 415, server component 420, satellite database 425, client database component 430, cluster database component 435, and channel processing component 440. The components of the computing server 145 are configured to operate and communicate with each other to implement the techniques described herein. In an example, the components of the computing server 145 communicate, such as to exchange data, control signals, or other information, using a hardware interconnect fabric (e.g., a data communication bus) and one or more inter-process communication techniques (e.g., shared memory spaces, operating system sockets, message passing, etc.).

The processor 410 is configured to execute one or more software applications, such as software applications that are associated with the server component 420, satellite database 425, client database component 430, cluster database component 435, or channel processing component 440.

The satellite network interface 410 and the data communication interface 415 includes one or more hardware data communication interfaces, such as satellite transceiver or a wired or wireless data communication network interface, such as for communication with the satellite network 115 or the data communication network 120 or 125.

The server component 420 includes one or more software applications that are configured to establish or maintain a communication session with a client application, such as an electronic meeting or remote collaboration client application, that is configured to execute on a remote computing system, such as the computing device 135. In an example, the server component 420 is configured to identify (e.g., obtain or retrieve) satellite data or satellite communication quality data from the satellite network 115 or the satellite network control station 150. In another example, the server component 420 is configured to identify location, route, and communication quality data of a remote computing system, such as the computing device 135. In another example, the server component 420 is configured to with operate one or more components of the computing server 145 to form or identify (e.g., form, generate, or dynamically adjust) satellite clusters and to communicate such clusters, or data that is indicative of such clusters, to the computing device 135, as described herein. The computing system can be configured to cause the computing device 135 to concurrently communicate with two or more satellites of the identified clusters, such as to achieve a communication objective. In another example, the server component 420 is configured to obtain process partitioned or redundant data communicated over two or more concurrent communication channels, as described herein.

The satellite database 425 include one or more hardware or software components of a database system that obtains, stores, and provides access to satellite data, satellite cluster data, and associated location or timing information obtained from the computing server 145, the satellite network 115, or the satellite network control station 150.

The client database 430 includes one or more hardware or software components of a database system that obtains, stores, and provides access to data that is indicative of the location, identity, communication objective, route information, or any other information that is associated with the remote computing system 135 and useful for implementing the techniques described herein. In an example, the client database 430 includes data that indicative of one or more satellite clusters that are associated with, or in use by, the computing device 135. Such data can include identifiers of satellites with which the computing device 135 concurrently communicates or data that is indicative of the concurrent communication techniques (e.g., data partitioning or redundant data transmission techniques) used by the computing device.

The cluster database 435 includes one or more hardware or software components of a database system that obtains, stores, and provides access to data that is indicative of one or more satellite clusters that are identified or generated by the computing server 145 or the computing device 135. Such data can include satellite information, communication quality information, service area information, or timing information, as described herein.

Figure 5:
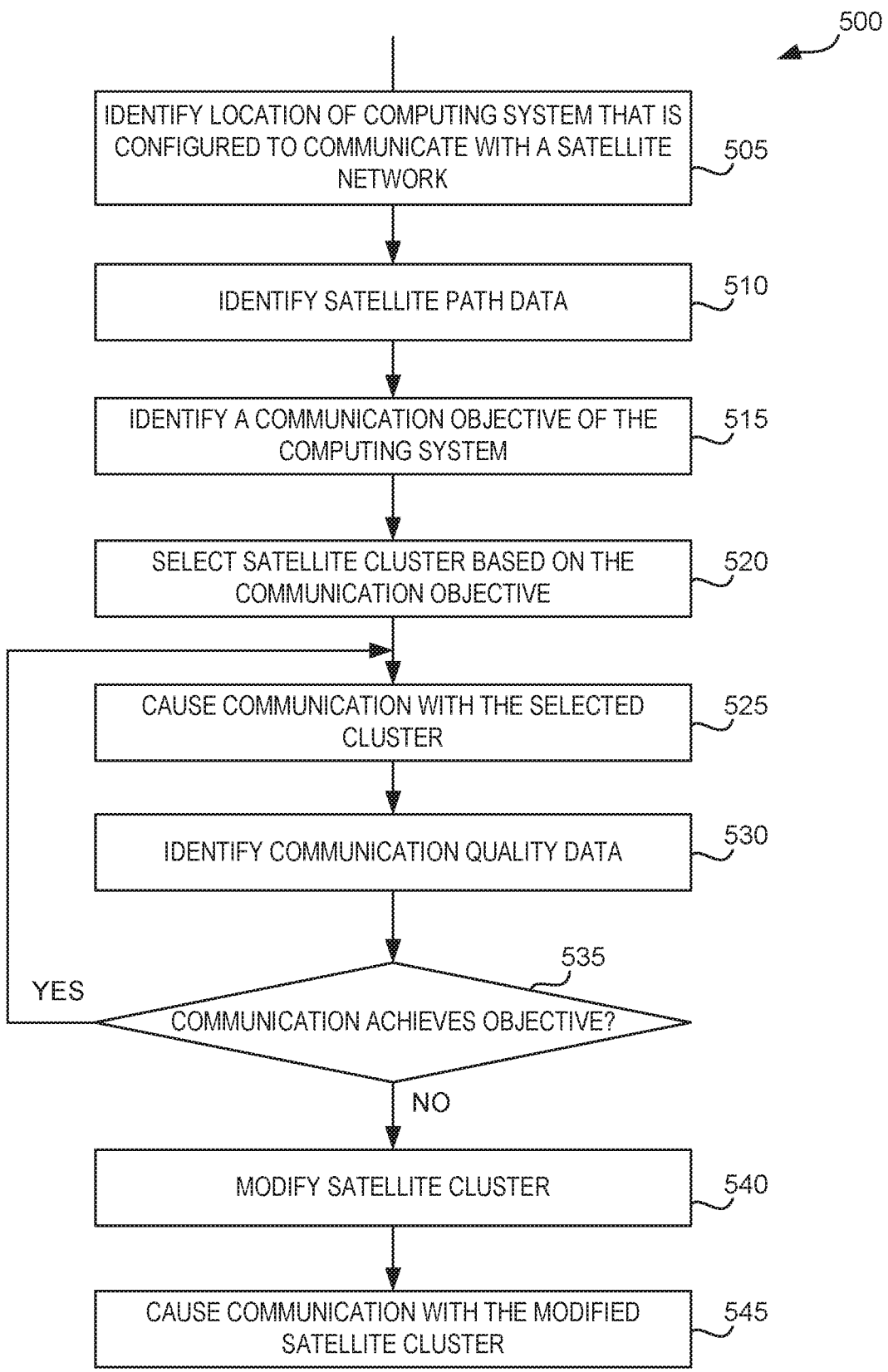
FIG. 5 illustrates a process for satellite data transmission clustering with dynamic clusters, according to some examples of the present disclosure.

FIG. 5 illustrates a process 500 for satellite data transmission clustering with dynamic clusters, according to some examples of the present disclosure. In an example the process 500 includes operations for implementing one or more of the techniques described in association with the discussion of FIGS. 1-4. The process 500 can be implemented by one or more of the computing device 135 and the computing server 145.

At 505, the location of a computing device that is configured to communicate with a satellite network is identified. In an example the location can be obtained by the computing server 145 from a remote computing device, such as the computing device 135. In another example, the location is obtained from a satellite network, such as the satellite network 115, or from a location sensor associated with the computing device.

At 510, satellite path data of one or more satellites in a satellite network is identified. In an example, the path data includes satellite ephemeris data that is indicative of the orbital trajectory of the one or more satellites. The path data can include timing information that is useful in combination with the orbital trajectory to determine a coverage area of the one or more satellites at an indicated time of day. In another example, the satellite data includes satellite communication data, such as for determining the quality of communications with the one or more satellites. Such satellite communication data can include data that is indicative of at least one of available satellite data communication bandwidth, throughput, congestion, BER, or latency. Such communication data can also include data that is indicative of the quality of communication signals detected at the computing system of the one or more satellites. In an example, the path data is obtained from at least one of a satellite control station, the satellite network (e.g., the one or more satellites), a database of historic satellite communication quality data, or one or more remote computing devices.

At 515, a communication objective of the computing device is identified. In an example, the communication objective includes a communication criterion for a communication session (e.g., a planned or prospective communication session) between the computing device and a satellite network. In an example, the communication criterion includes at least one of a communication session interruption threshold for the communication session, a communication error rate for the communication session, a communication bandwidth for the communication session, a communication latency for the communication session, a communication security criteria for the communication session, or a communication energy criteria for the communication session.

At 520, a satellite cluster is selected based on the identified communication objective and satellite data. In an example, selecting the satellite cluster includes selecting, based on the location and the path data, a first set of two or more satellites from the satellite network to communicate with the computing system for the communication session. Such selecting further includes selecting a subset of two or more satellites from the first set of two or more satellites based on a determination that satellite communication quality data for the subset of two or more satellites indicates that communication with the satellites achieves (or will likely achieve) the communication objective.

In an example, if a communication objective includes achieving a bandwidth (or achieving a target minimum bandwidth) for a span of time during the communication session, a satellite cluster can be selected or formed by selecting satellites that maximize communication bandwidth or that are configured to establish or maintain communication channels that have at least an indicated bandwidth. In another example, if a communication objective includes achieving a latency that is below a threshold latency, a satellite cluster can be selected or formed by selecting satellites that configured route packets thought satellite network with an indicated maximum latency. In another example, if the communication objective includes achieving a handover requirement (e.g., minimizing the number of handovers), a satellite cluster can be selected or formed by selecting satellites based on their distance from the computing device or based on their movement relative to the movement or position of the computing device.

Generally, satellites can be selected for a cluster, or a cluster of satellites can be selected from a set of satellite clusters, according to an algorithm, such as an optimization algorithm that selects satellites that optimizes the formation or use of a communication channel with respect to, or in view of, achieving the indicated communication objective. In an example, an objective function is formed by identifying communication parameter of each satellite in the satellite network that are associated with an indicated communication objective. Such communication parameter includes any characteristic of a satellite (e.g., location, orbital trajectory, load, communication resources, movement or position relative to a computing device, etc.) or a communication channel formed with the satellite (e.g., bandwidth, error rate, latency, signal quality, etc.). Each communication parameter is assigned a value (e.g., a numeric or categorical value) based on an appropriate scale. As an example, if the communication objective includes a target bandwidth, the scale can include bytes per second, or any other suitable scale. As another example, if the communication objective includes a target maximum latency, the scale can include packet delivery time, round trip time, or any other suitable scale. The parameters can then be jointly logically or algebraically combined, such as a in linear equation, to form the objective function. The objective function can then be optimized with respect to the communication objective or one or more of the communication parameters. The optimized parameters can then be used to select one or more satellites.

Satellites can be selected for a cluster, or a cluster of satellites can be selected from a set of satellite clusters, according to ranking algorithm. In an example, a communication parameter associated with each criterion of a communication objective is ranked, such as by assigning each parameter a number value, such as an integer value between 1 and 5. The value can be assigned based on an importance of the parameter to the communication objective. A bandwidth parameter, for example, is assigned a value of 1, such as to indicate that the parameter is of low importance to the communication objective, a value of 5 (e.g., such as to indicate that the parameter is of high importance to the communication objective). Similarly, a latency parameter can be assigned a value of 1, such as to indicate that the parameter is of low importance to the communication objective, a value of 5 (e.g., such as to indicate that the parameter is of high importance to the communication objective). Any other communication parameter described herein can be allocated similar designations. The ranks of the communication parameters are then used as weightings for each of the parameters for the satellite and then input that into a scoring algorithm and to select satellites that score the highest.

At 525, the computing device is caused, configured, or actuated, to communicate with the selected satellite cluster, such as by concurrently communicating with two or more satellites of the cluster to achieve the communication objective. In an example, causing concurrent communication with the selected satellite cluster includes determining that a first satellite of the two or more satellites of the cluster meet a first criterion of the communication objective and a second satellite of the two or more satellites of the cluster meets a second criterion of the communication objective, and, responsive to the determination, causing communication of first data using the first satellite and second data using the second satellite. In an example, such first data is associated with the first criterion of the communication objective and the second data is associated with the second s criterion of the communication objective. In another example, causing concurrent communication with the selected satellite cluster includes causing communication of first data using a first satellite of the two or more satellites of the cluster, and causing communication of second data using a second satellite of the two or more satellites of the cluster, the second data comprising information for correcting errors in the first data. In another example, causing concurrent communication with the selected satellite cluster includes determining that redundant operation of a first and second satellite of the two or more satellites of the cluster achieves (or will achieve) the communication objective and, responsive to the determination, causing redundant communication of communication data using the first satellite and the second satellite. In another example, causing concurrent communication with the selected satellite cluster includes determining that multiplexed operation of a first and second satellite of the two or more satellites of the cluster achieves (or will achieve) the communication objective and, responsive to the determining, multiplexing transmission of communication data between the first satellite and the second satellite.

In an example, concurrent communication with two or more satellites include simultaneously communicating data to the two or more satellites from a single computing device. In another example, concurrent communication with two or more satellites include interlacing the communication of data to the two or more satellites, such as by sending first data to a first satellite at a first time and sending second data to a second satellite at a second time, where the first time is different from the second time.

At 530, communication quality data for one or more satellites in the subset of two or more satellites that is indicative of a quality of communication between the computing device and the satellite network is obtained. In an example, the communication quality data is obtained from at least one of a satellite control station, the satellite network (e.g., the one or more satellites), or one or more remote computing devices.

At 535, a determination is made as to whether the quality of communications between the computing device and the satellite network achieves (or will achieve) the communication objective. In an example, the determination is made according to any of the techniques described in the examples included in the discussion of FIG. 1. In an example, the communication objective includes one or more communication session threshold requirement, such that a communication session parameter or metric (e.g., any parameter of metric associated with the quality of communication session or communication channel) that fails to meet the threshold fails to achieve the communication objective, as described herein. A communication session parameter or metric meets a threshold that identifies an upper or maximum tolerable limit by maintaining a value that is at or below the limit. A communication session parameter or metric meets a threshold that identifies a lower or minimum tolerable limit by maintaining a value that is at or above the limit At 540, responsive to determining that the quality of the communication between the computing system and the satellite network does not achieve, or will not achieve, the communication objective or associated communication criterion, modify the satellite cluster, such as by adding or removing one or more satellites, to improve the quality of the communication between the computing system and the satellite network to achieve the communication objective. Such modification can include selecting satellites or satellite clusters according to the techniques described at step 520, or any other technique described herein. In an example, satellites of the satellite network (e.g., satellites that are in LOS communication range of the computing device) or communication parameters associated with the satellites are rescored or ranked according to an indicated interval using measured communication channel data or satellite data. The updated scoring is then used to obtain a more optimal satellite cluster using the techniques described at 520. Individual satellites can then be swapped in or out of a cluster on their scores.

At 545, the computing system is caused, configured, or actuated, to communicate with the modified satellite cluster, such as by concurrently communicating with two or more satellites of the cluster to achieve the communication objective, as described herein.

Figure 6:
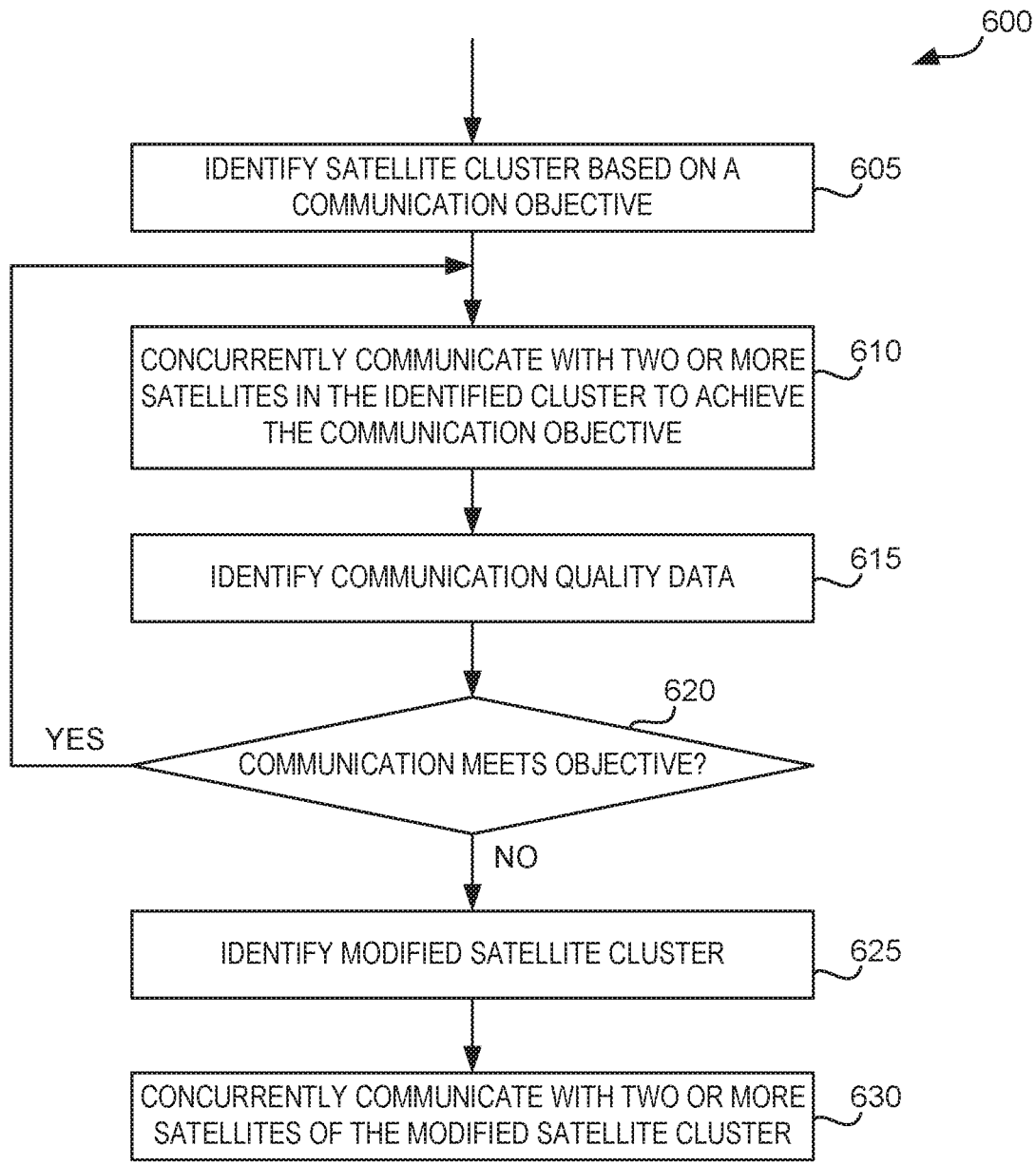
FIG. 6 illustrates a process for satellite data transmission clustering with dynamic clusters at a computing device, according to some examples of the present disclosure.

FIG. 6 illustrates a process for satellite data transmission clustering with dynamic clusters at a computing device, according to some examples of the present disclosure. The process 600 can be executed by a computing device, such as the computing device 135, to cause the computing device to communicate concurrently with a cluster of two or more satellites of a satellite network. At 605, a satellite cluster is identified based on a communication objective of the computing device. At 610, the computing device concurrently communicates with two or more satellites of the satellite cluster to achieve the communication objective. At 615, communication quality data is identified. At 620, a determination is made as to whether the quality of communications between the computing device and the satellite cluster achieves, or will achieve, the communication objective. At 625, a modified satellite cluster is identified, wherein the modified satellite cluster includes at least one satellite that differs from satellites included in the previously identified satellite cluster. At 630, the computing device is actuated to concurrently communicate with two or more satellites of the modified satellite cluster.

The process 500 or the process 600 can include any other steps or operations for implementing the techniques described herein. While the operations of the process 500 and the process 600 are shown as happening sequentially in a specific order, in other examples, one or more of the operations may be performed in parallel or in a different order. Additionally, one or more operations may be repeated two or more times.

Figure 7:
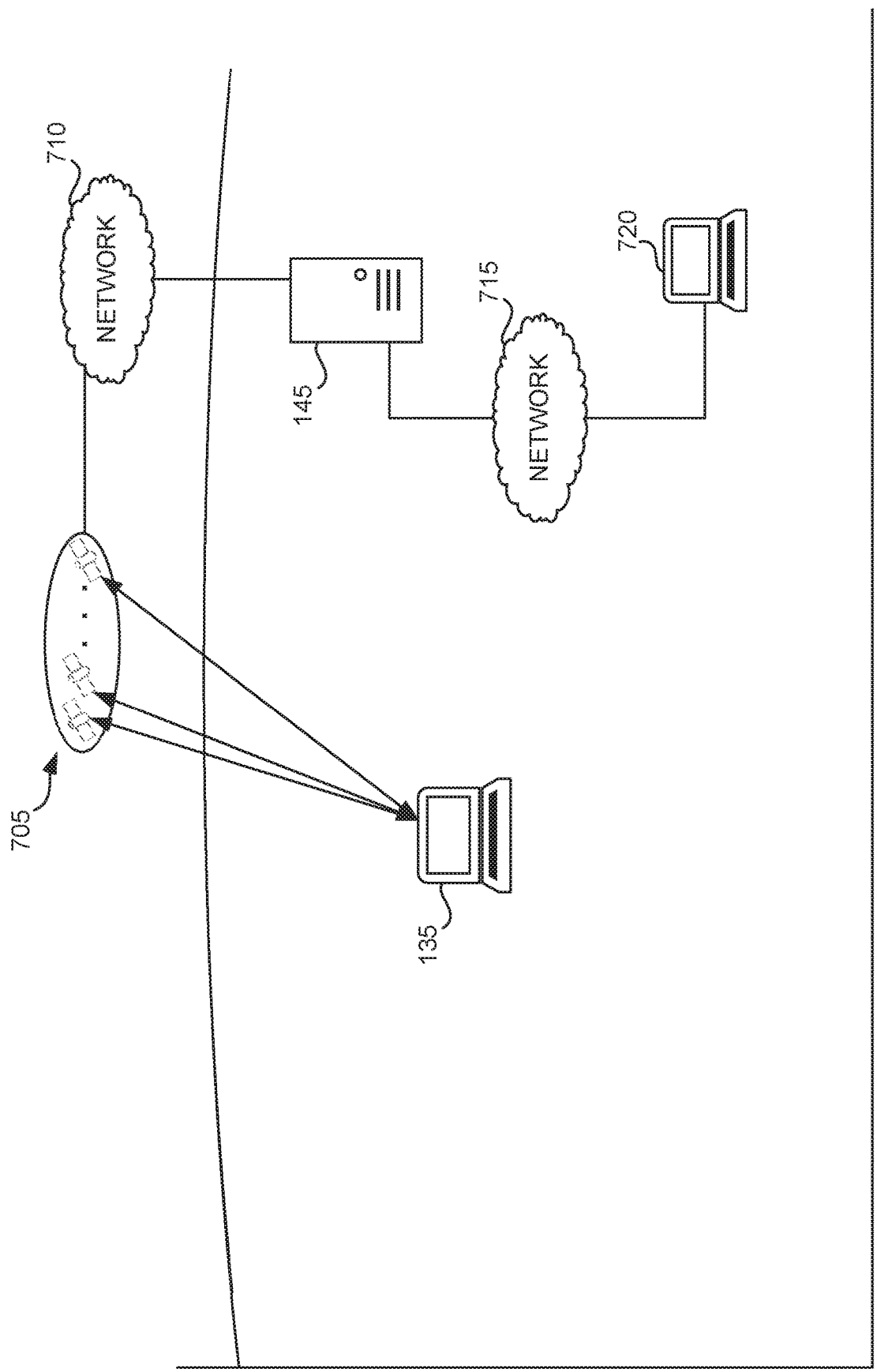
FIG. 7 illustrates an example of an environment for satellite data transmission clustering with dynamic clusters, according to some examples of the present disclosure.

FIG. 7 illustrates an example of an environment for satellite data transmission clustering with dynamic clusters, according to some examples of the present disclosure. A computing device 135 is configured to communicate with a computing server 145 that is configured to host communication sessions between one or more remote computing system. The computing server 145 identifies, such as from a computing system that is associated with the satellite network control station 150, satellite data with satellites in the satellite network, such as data that is indicative of a trajectory or orbital of the satellites, or data that is indicative of the current or prospective communication quality of communication channels established with the satellites. The computing server 145 also identifies data that is indicative of a location of the computing device 135. In an example, the computing device 135 is a mobile computing device and the location of the computing device includes a planned travel route of the computing device. In an example, the computing server 145 obtains data that is indicative of a communication objective of the computing device or a host application of the computing server. The computing server 145 forms one or more satellites clusters 705 by allocating satellites of the satellite network to the one or more satellite clusters based on the satellite data, the location of the computing device 135, and the communication objective. The satellites in each cluster are associated with data that is indicated of the spatial and temporal distribution of satellites (e.g., satellite path and timing data) in the satellite network. In an example, a first cluster of satellites include satellites that service a first area during a first span of time, while a second cluster of satellites includes satellites that service a second area during a second span of time. The computing server 145 causes the computing device 135 to concurrently communicate with two or more satellites in a satellite cluster during a communication session. The computing server 145 additionally identifies data that is indicative of the communication quality of the communications between the computing device and the two or more satellites, such as by receiving such communication quality data from the computing device or the satellite network. The computing server 145 then determines, based on the communication quality data, whether communication with satellites of a current cluster achieve, or will likely achieve, the communication objective. The computing server 145 then causes, based on the determination, the computing device 135 to communicate with satellites of another cluster in response to determining that communication with satellites of a current cluster does not achieve the communication objective.

In an example, the computing device 135 concurrently transmits data to two or more satellites in the satellite cluster 705. The data is transmitted to the satellites using distinct communication channels for communication with each satellite. Such data can be allocated between each satellite according to a prescribed allocation scheme. The two or more satellites can then relay the transmitted information to the computing server 145 through direct satellite communication with the computing server or by using the data communication network 710. The computing server 145 can then process the received data, based on the prescribed allocation technique, to integrate the data transmitted to each satellite over each distinct communication channel into a coherent data stream of a communication session. In an example the computing server relays the coherent data stream to a remote computing device 720 using the data communication network 715.

Figure 8:
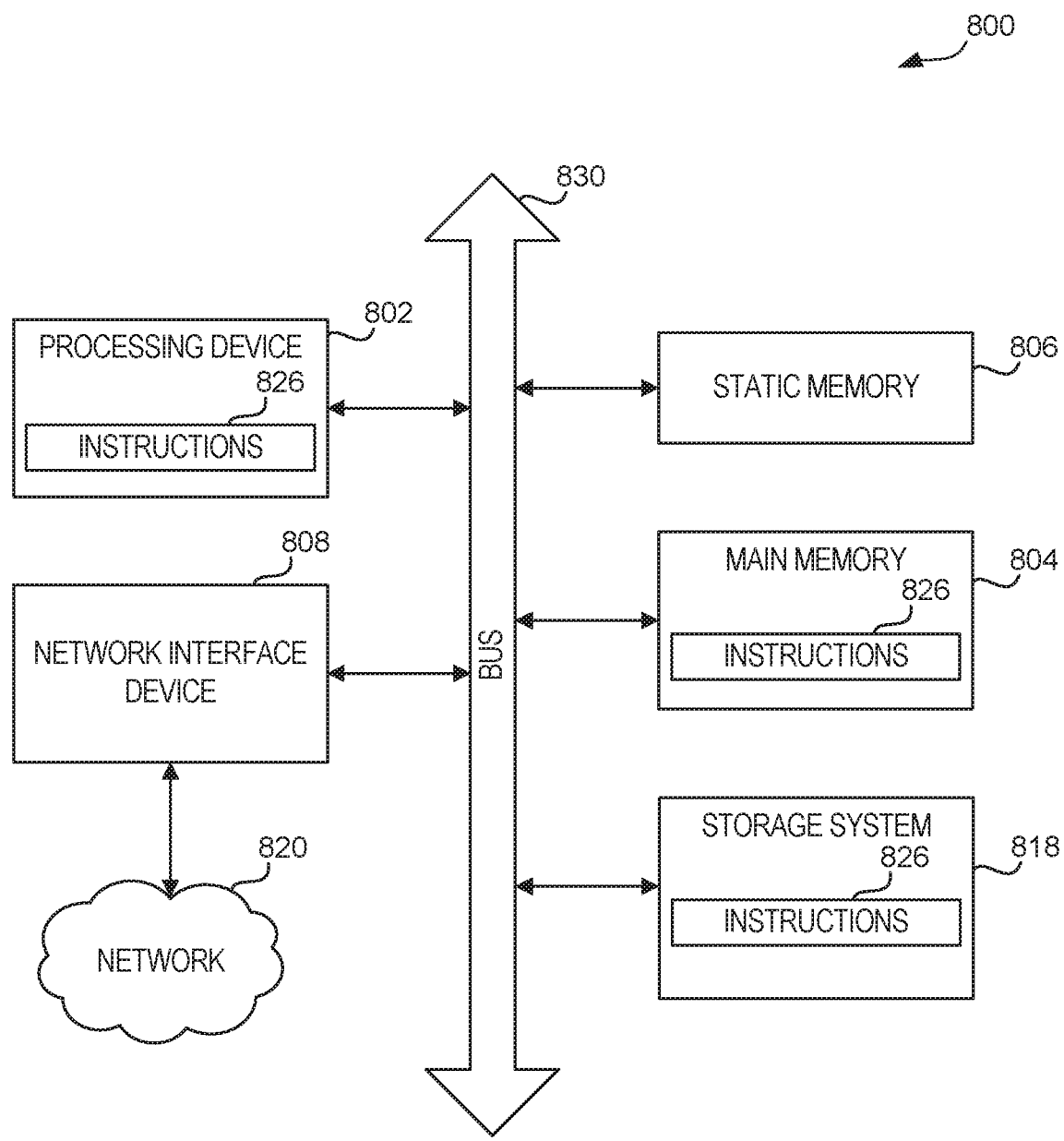
FIG. 8 is a block diagram illustrating an example of a machine upon which one or more examples of the present disclosure may be implemented.

FIG. 8 illustrates a block diagram of an example machine 800 upon which any one or more of the techniques (e.g., methodologies) discussed herein may be implemented. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 800 may implement the transmitters and/or receivers disclosed herein. Furthermore, machine 800 may include the transmitters and/or receivers disclosed herein. Machine 800 may implement any of the methods disclosed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, components, or mechanisms. Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or another sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Other Notes and Examples

Example 1 is a method for satellite communications, the method comprising: identifying a location of a computing device; for a set of satellite in a satellite network comprising two or more satellites, identifying satellite path data and first satellite communication quality data; identifying a communication objective of the computing device, the communication objective identifying a criterion for a planned communication between the computing device and the satellite network; selecting a first set of two or more satellites from the satellite network to communicate with the computing device for the planned communication based on the location and the path data; selecting a subset of two or more satellites from the first set of two or more satellites based on a determination that satellite communication quality data for the subset of two or more satellites meets the criterion; causing the computing device to begin the planned communication by concurrently communicating with at least two satellites in the subset of two or more satellites; identifying second satellite communication quality data for one or more satellites in the subset of two or more satellites, the second satellite communication quality data corresponding to a quality of communication between the computing device and the satellite network; determining, based on the second satellite communication quality data, that the quality of the communication between the computing device and the satellite network does not meet the criterion; responsive to determining that the quality of the communication between the computing device and the satellite network does not meet the criterion, modifying the subset of two or more satellites by adding or removing one or more satellites to improve the quality of the communication between the computing device and the satellite network to meet the criterion; and causing the computing device to continue the planned communication by concurrently communicating with at least two satellites in the modified subset of two or more satellites, the at least two satellites in the modified subset of two or more satellites differing in at least one satellite from the at least two satellites in the subset of two or more satellites.

In Example 2, the subject matter of Example 1 includes, wherein the satellite path data comprises timing data and location data that is indicative of a coverage area where the satellite provides communication service within an indicated time period.

In Example 3, the subject matter of Examples 1-2 includes, wherein the first communication data comprises data that is indicative of at least one of available satellite data communication bandwidth, throughput, congestion, or latency.

In Example 4, the subject matter of Examples 1-3 includes, identifying the path data and first satellite communication quality data from at least one of: a satellite control station, the satellite network, a database of historic satellite communication quality data for the first satellites, or one or more remote computing systems.

In Example 5, the subject matter of Examples 1-4 includes, wherein the criterion comprises at least one of: a communication session interruption threshold for the planned communication, a communication error rate for the planned communication, a communication bandwidth for the planned communication, a communication latency for the planned communication, a communication security criteria for the planned communication, or a communication energy criteria for the planned communication.

In Example 6, the subject matter of Examples 1-5 includes, determining that a first satellite of the at least two satellites in the subset of two or more satellites satisfies a first criterion of the communication objective and a second satellite of the at least two satellites in the subset of two or more satellites satisfies a second criterion of the communication objective; and responsive to determining that a first satellite satisfies the first criterion and the second satellite the second criterion, causing communication of first data using the first satellite and second data using the second satellite, wherein the first data is associated with the first criterion of the communication objective and the second data is associated with the second s criterion of the communication objective.

In Example 7, the subject matter of Examples 1-6 includes, causing communication of first data using a first satellite of the at least two satellites in the subset of two or more satellites; and causing communication of second data using a second satellite of the at least two satellites in the subset of two or more satellites, the second data comprising information for correcting errors in the first data.

In Example 8, the subject matter of Examples 1-7 includes, determining that redundant operation of a first and second satellite of the at least two satellites in the subset of two or more satellites satisfies the criterion; and responsive to determining that redundant operation of the first satellite and the second satellite satisfies the criterion, causing redundant communication of first data using the first satellite and the second satellite.

In Example 9, the subject matter of Examples 1-8 includes, determining that multiplexed operation of a first and second satellite of the at least two satellites in the subset of two or more satellites satisfies the criterion; and responsive to determining that multiplexed operation of the first satellite and the second satellite satisfies the criterion, multiplexing transmission of the first data between the first satellite and the second satellite.

In Example 10, the subject matter of Examples 1-9 includes, receiving first data at a first satellite of the at least two satellites in the subset of two or more satellites; receiving second data at a second satellite of the at least two satellites in the subset of two or more satellites; and combining the first data with the second data with by using sequence data associated with the first data and the second data to determine a combined sequence order of the first data and the second data.

Example 11 is a computing system for satellite communications, the system comprising: a hardware processor configured to perform operations comprising: identifying a location of a computing device; for a set of satellite in a satellite network comprising two or more satellites, identifying satellite path data and first satellite communication quality data; identifying a communication objective of the computing device, the communication objective identifying a criterion for a planned communication between the computing device and the satellite network; selecting a first set of two or more satellites from the satellite network to communicate with the computing device for the planned communication based on the location and the path data; selecting a subset of two or more satellites from the first set of two or more satellites based on a determination that satellite communication quality data for the subset of two or more satellites meets the criterion; causing the computing device to begin the planned communication by concurrently communicating with at least two satellites in the subset of two or more satellites; identifying second satellite communication quality data for one or more satellites in the subset of two or more satellites, the second satellite communication quality data corresponding to a quality of communication between the computing device and the satellite network; determining, based on the second satellite communication quality data, that the quality of the communication between the computing device and the satellite network does not meet the criterion; responsive to determining that the quality of the communication between the computing device and the satellite network does not meet the criterion, modifying the subset of two or more satellites by adding or removing one or more satellites to improve the quality of the communication between the computing device and the satellite network to meet the criterion; and causing the computing device to continue the planned communication by concurrently communicating with at least two satellites in the modified subset of two or more satellites, the at least two satellites in the modified subset of two or more satellites differing in at least one satellite from the at least two satellites in the subset of two or more satellites.

In Example 12, the subject matter of Example 11 includes, wherein the satellite path data comprises timing data and location data that is indicative of a coverage area where the satellite provides communication service within an indicated time period.

In Example 13, the subject matter of Examples 11-12 includes, wherein the first communication data comprises data that is indicative of at least one of available satellite data communication bandwidth, throughput, congestion, or latency.

In Example 14, the subject matter of Examples 11-13 includes, wherein the operations further comprise: identifying the path data and first satellite communication quality data from at least one of: a satellite control station, the satellite network, a database of historic satellite communication quality data for the first satellites, or one or more remote computing systems.

In Example 15, the subject matter of Examples 11-14 includes, wherein the criterion comprises at least one of: a communication session interruption threshold for the planned communication, a communication error rate for the planned communication, a communication bandwidth for the planned communication, a communication latency for the planned communication, a communication security criteria for the planned communication, or a communication energy criteria for the planned communication.

In Example 16, the subject matter of Examples 11-15 includes, wherein the operations further comprise: determining that a first satellite of the at least two satellites in the subset of two or more satellites satisfies a first criterion of the communication objective and a second satellite of the at least two satellites in the subset of two or more satellites satisfies a second criterion of the communication objective; and responsive to determining that a first satellite satisfies the first criterion and the second satellite the second criterion, causing communication of first data using the first satellite and second data using the second satellite, wherein the first data is associated with the first criterion of the communication objective and the second data is associated with the second s criterion of the communication objective.

In Example 17, the subject matter of Examples 11-16 includes, wherein the operations further comprise: causing communication of first data using a first satellite of the at least two satellites in the subset of two or more satellites; and causing communication of second data using a second satellite of the at least two satellites in the subset of two or more satellites, the second data comprising information for correcting errors in the first data.

In Example 18, the subject matter of Examples 11-17 includes, wherein the operations further comprise: determining that redundant operation of a first and second satellite of the at least two satellites in the subset of two or more satellites satisfies the criterion; and responsive to determining that redundant operation of the first satellite and the second satellite satisfies the criterion, causing redundant communication of first data using the first satellite and the second satellite.

In Example 19, the subject matter of Examples 11-18 includes, wherein the operations further comprise: determining that multiplexed operation of a first and second satellite of the at least two satellites in the subset of two or more satellites satisfies the criterion; and responsive to determining that multiplexed operation of the first satellite and the second satellite satisfies the criterion, multiplexing transmission of the first data between the first satellite and the second satellite.

In Example 20, the subject matter of Examples 11-19 includes, wherein the operations further comprise: receiving first data at a first satellite of the at least two satellites in the subset of two or more satellites; receiving second data at a second satellite of the at least two satellites in the subset of two or more satellites; and combining the first data with the second data with by using sequence data associated with the first data and the second data to determine a combined sequence order of the first data and the second data.

Example 21 is a machine-readable medium storing instructions for receiving multiplexed data over an optical communication path, the instructions, when executed by a machine, cause the machine to perform operations comprising: identifying a location of a computing device; for a set of satellite in a satellite network comprising two or more satellites, identifying satellite path data and first satellite communication quality data; identifying a communication objective of the computing device, the communication objective identifying a criterion for a planned communication between the computing device and the satellite network; selecting a first set of two or more satellites from the satellite network to communicate with the computing device for the planned communication based on the location and the path data; selecting a subset of two or more satellites from the first set of two or more satellites based on a determination that satellite communication quality data for the subset of two or more satellites meets the criterion; causing the computing device to begin the planned communication by concurrently communicating with at least two satellites in the subset of two or more satellites; identifying second satellite communication quality data for one or more satellites in the subset of two or more satellites, the second satellite communication quality data corresponding to a quality of communication between the computing device and the satellite network; determining, based on the second satellite communication quality data, that the quality of the communication between the computing device and the satellite network does not meet the criterion; responsive to determining that the quality of the communication between the computing device and the satellite network does not meet the criterion, modifying the subset of two or more satellites by adding or removing one or more satellites to improve the quality of the communication between the computing device and the satellite network to meet the criterion; and causing the computing device to continue the planned communication by concurrently communicating with at least two satellites in the modified subset of two or more satellites, the at least two satellites in the modified subset of two or more satellites differing in at least one satellite from the at least two satellites in the subset of two or more satellites.

In Example 22, the subject matter of Example 21 includes, wherein the satellite path data comprises timing data and location data that is indicative of a coverage area where the satellite provides communication service within an indicated time period.

In Example 23, the subject matter of Examples 21-22 includes, wherein the first communication data comprises data that is indicative of at least one of available satellite data communication bandwidth, throughput, congestion, or latency.

In Example 24, the subject matter of Examples 21-23 includes, wherein the operations further comprise: identifying the path data and first satellite communication quality data from at least one of: a satellite control station, the satellite network, a database of historic satellite communication quality data for the first satellites, or one or more remote computing systems.

In Example 25, the subject matter of Examples 21-24 includes, wherein the criterion comprises at least one of: a communication session interruption threshold for the planned communication, a communication error rate for the planned communication, a communication bandwidth for the planned communication, a communication latency for the planned communication, a communication security criteria for the planned communication, or a communication energy criteria for the planned communication.

In Example 26, the subject matter of Examples 21-25 includes, wherein the operations further comprise: determining that a first satellite of the at least two satellites in the subset of two or more satellites satisfies a first criterion of the communication objective and a second satellite of the at least two satellites in the subset of two or more satellites satisfies a second criterion of the communication objective; and responsive to determining that a first satellite satisfies the first criterion and the second satellite the second criterion, causing communication of first data using the first satellite and second data using the second satellite, wherein the first data is associated with the first criterion of the communication objective and the second data is associated with the second s criterion of the communication objective.

In Example 27, the subject matter of Examples 21-26 includes, wherein the operations further comprise: causing communication of first data using a first satellite of the at least two satellites in the subset of two or more satellites; and causing communication of second data using a second satellite of the at least two satellites in the subset of two or more satellites, the second data comprising information for correcting errors in the first data.

In Example 28, the subject matter of Examples 21-27 includes, wherein the operations further comprise: determining that redundant operation of a first and second satellite of the at least two satellites in the subset of two or more satellites satisfies the criterion; and responsive to determining that redundant operation of the first satellite and the second satellite satisfies the criterion, causing redundant communication of first data using the first satellite and the second satellite.

In Example 29, the subject matter of Examples 21-28 includes, wherein the operations further comprise: determining that multiplexed operation of a first and second satellite of the at least two satellites in the subset of two or more satellites satisfies the criterion; and responsive to determining that multiplexed operation of the first satellite and the second satellite satisfies the criterion, multiplexing transmission of the first data between the first satellite and the second satellite.

In Example 30, the subject matter of Examples 21-29 includes, wherein the operations further comprise: receiving first data at a first satellite of the at least two satellites in the subset of two or more satellites; receiving second data at a second satellite of the at least two satellites in the subset of two or more satellites; and combining the first data with the second data with by using sequence data associated with the first data and the second data to determine a combined sequence order of the first data and the second data.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

What is claimed is:

1. A method for satellite communications, the method comprising:
    identifying a location of a computing device;
    for a set of satellite in a satellite network comprising two or more satellites, identifying satellite path data and first satellite communication quality data;
    identifying a communication objective of the computing device, the communication objective identifying a criterion for a planned communication between the computing device and the satellite network;
    selecting a first set of two or more satellites from the satellite network to communicate with the computing device for the planned communication based on the location and the path data;
    selecting a subset of two or more satellites from the first set of two or more satellites based on a determination that satellite communication quality data for the subset of two or more satellites meets the criterion;
    causing the computing device to begin the planned communication by concurrently communicating with at least two satellites in the subset of two or more satellites;
    identifying second satellite communication quality data for one or more satellites in the subset of two or more satellites, the second satellite communication quality data corresponding to a quality of communication between the computing device and the satellite network;
    determining, based on the second satellite communication quality data, that the quality of the communication between the computing device and the satellite network does not meet the criterion;
    responsive to determining that the quality of the communication between the computing device and the satellite network does not meet the criterion, modifying the subset of two or more satellites by adding or removing one or more satellites to improve the quality of the communication between the computing device and the satellite network to meet the criterion; and
    causing the computing device to continue the planned communication by concurrently communicating with at least two satellites in the modified subset of two or more satellites, the at least two satellites in the modified subset of two or more satellites differing in at least one satellite from the at least two satellites in the subset of two or more satellites.

2. The method of claim 1, wherein the satellite path data comprises timing data and location data that is indicative of a coverage area where the satellite provides communication service within an indicated time period.

3. The method of claim 1, wherein the first communication data comprises data that is indicative of at least one of available satellite data communication bandwidth, throughput, congestion, or latency.

4. The method of claim 1, further comprising identifying the path data and first satellite communication quality data from at least one of:
   a satellite control station,
   the satellite network,
   a database of historic satellite communication quality data for the first satellites, or one or more remote computing systems.

5. The method of claim 1, wherein the criterion comprises at least one of:
   a communication session interruption threshold for the planned communication,
   a communication error rate for the planned communication,
   a communication bandwidth for the planned communication,
   a communication latency for the planned communication,
   a communication security criteria for the planned communication, or
   a communication energy criteria for the planned communication.

6. The method of claim 1, further comprising:
   determining that a first satellite of the at least two satellites in the subset of two or more satellites satisfies a first criterion of the communication objective and a second satellite of the at least two satellites in the subset of two or more satellites satisfies a second criterion of the communication objective; and
   responsive to determining that a first satellite satisfies the first criterion and the second satellite the second criterion, causing communication of first data using the first satellite and second data using the second satellite, wherein the first data is associated with the first criterion of the communication objective and the second data is associated with the second s criterion of the communication objective.

7. The method of claim 1, further comprising:
   causing communication of first data using a first satellite of the at least two satellites in the subset of two or more satellites; and
   causing communication of second data using a second satellite of the at least two satellites in the subset of two or more satellites, the second data comprising information for correcting errors in the first data.

8. The method of claim 1, further comprising:
   determining that redundant operation of a first and second satellite of the at least two satellites in the subset of two or more satellites satisfies the criterion; and
   responsive to determining that redundant operation of the first satellite and the second satellite satisfies the criterion, causing redundant communication of first data using the first satellite and the second satellite.

9. The method of claim 1, further comprising:
   determining that multiplexed operation of a first and second satellite of the at least two satellites in the subset of two or more satellites satisfies the criterion; and
   responsive to determining that multiplexed operation of the first satellite and the second satellite satisfies the criterion, multiplexing transmission of the first data between the first satellite and the second satellite.

10. The method of claim 1, further comprising:
    receiving first data at a first satellite of the at least two satellites in the subset of two or more satellites;
    receiving second data at a second satellite of the at least two satellites in the subset of two or more satellites; and
    combining the first data with the second data with by using sequence data associated with the first data and the second data to determine a combined sequence order of the first data and the second data.

11. A computing system for satellite communications, the system comprising:
    a hardware processor configured to perform operations comprising:
    identifying a location of a computing device;
    for a set of satellite in a satellite network comprising two or more satellites, identifying satellite path data and first satellite communication quality data;
    identifying a communication objective of the computing device, the communication objective identifying a criterion for a planned communication between the computing device and the satellite network;
    selecting a first set of two or more satellites from the satellite network to communicate with the computing device for the planned communication based on the location and the path data;
    selecting a subset of two or more satellites from the first set of two or more satellites based on a determination that satellite communication quality data for the subset of two or more satellites meets the criterion;
    causing the computing device to begin the planned communication by concurrently communicating with at least two satellites in the subset of two or more satellites;
    identifying second satellite communication quality data for one or more satellites in the subset of two or more satellites, the second satellite communication quality data corresponding to a quality of communication between the computing device and the satellite network;
    determining, based on the second satellite communication quality data, that the quality of the communication between the computing device and the satellite network does not meet the criterion;
    responsive to determining that the quality of the communication between the computing device and the satellite network does not meet the criterion, modifying the subset of two or more satellites by adding or removing one or more satellites to improve the quality of the communication between the computing device and the satellite network to meet the criterion; and
    causing the computing device to continue the planned communication by concurrently communicating with at least two satellites in the modified subset of two or more satellites, the at least two satellites in the modified subset of two or more satellites differing in at least one satellite from the at least two satellites in the subset of two or more satellites.

12. The computing system of claim 11, wherein the satellite path data comprises timing data and location data that is indicative of a coverage area where the satellite provides communication service within an indicated time period.

13. The computing system of claim 11, wherein the first communication data comprises data that is indicative of at least one of available satellite data communication bandwidth, throughput, congestion, or latency.

14. The computing system of claim 11, wherein the operations further comprise:
identifying the path data and first satellite communication quality data from at least one of:
a satellite control station,
the satellite network,
a database of historic satellite communication quality data for the first satellites, or one or more remote computing systems.

15. The computing system of claim 11, wherein the criterion comprises at least one of:
a communication session interruption threshold for the planned communication,
a communication error rate for the planned communication,
a communication bandwidth for the planned communication,
a communication latency for the planned communication,
a communication security criteria for the planned communication, or
a communication energy criteria for the planned communication.

16. The computing system of claim 11, wherein the operations further comprise:
determining that a first satellite of the at least two satellites in the subset of two or more satellites satisfies a first criterion of the communication objective and a second satellite of the at least two satellites in the subset of two or more satellites satisfies a second criterion of the communication objective; and
responsive to determining that a first satellite satisfies the first criterion and the second satellite the second criterion, causing communication of first data using the first satellite and second data using the second satellite, wherein the first data is associated with the first criterion of the communication objective and the second data is associated with the second s criterion of the communication objective.

17. A non-transitory machine-readable medium storing instructions for receiving data over an optical communication path, the instructions, when executed by a machine, cause the machine to perform operations comprising:
identifying a location of a computing device;
for a set of satellite in a satellite network comprising two or more satellites, identifying satellite path data and first satellite communication quality data;
identifying a communication objective of the computing device, the communication objective identifying a criterion for a planned communication between the computing device and the satellite network;
selecting a first set of two or more satellites from the satellite network to communicate with the computing device for the planned communication based on the location and the path data;
selecting a subset of two or more satellites from the first set of two or more satellites based on a determination that satellite communication quality data for the subset of two or more satellites meets the criterion;
causing the computing device to begin the planned communication by concurrently communicating with at least two satellites in the subset of two or more satellites;
identifying second satellite communication quality data for one or more satellites in the subset of two or more satellites, the second satellite communication quality data corresponding to a quality of communication between the computing device and the satellite network;
determining, based on the second satellite communication quality data, that the quality of the communication between the computing device and the satellite network does not meet the criterion;
responsive to determining that the quality of the communication between the computing device and the satellite network does not meet the criterion, modifying the subset of two or more satellites by adding or removing one or more satellites to improve the quality of the communication between the computing device and the satellite network to meet the criterion; and
causing the computing device to continue the planned communication by concurrently communicating with at least two satellites in the modified subset of two or more satellites, the at least two satellites in the modified subset of two or more satellites differing in at least one satellite from the at least two satellites in the subset of two or more satellites.

18. The non-transitory machine-readable medium of claim 17, wherein the satellite path data comprises timing data and location data that is indicative of a coverage area where the satellite provides communication service within an indicated time period.

19. The non-transitory machine-readable medium of claim 17, wherein the first communication data comprises data that is indicative of at least one of available satellite data communication bandwidth, throughput, congestion, or latency.

20. The non-transitory machine-readable medium of claim 17, wherein the operations further comprise:
identifying the path data and first satellite communication quality data from at least one of:
a satellite control station,
the satellite network,
a database of historic satellite communication quality data for the first satellites, or
one or more remote computing systems.

* * * * *